US007648259B1

(12) United States Patent
Lin

(10) Patent No.: US 7,648,259 B1
(45) Date of Patent: Jan. 19, 2010

(54) LAMP ASSEMBLY

(75) Inventor: Yu-Yuan Lin, Tainan (TW)

(73) Assignee: UNI-Splendor Corp., Tainan (TW)

( * ) Notice: Subject to any disclaimer, the term of this patent is extended or adjusted under 35 U.S.C. 154(b) by 11 days.

(21) Appl. No.: 12/179,656

(22) Filed: Jul. 25, 2008

(51) Int. Cl.
*B60Q 1/00* (2006.01)

(52) U.S. Cl. ....................................... 362/368; 362/374

(58) Field of Classification Search ................. 362/368, 362/374, 375; 174/50, 520, 17 R, 535
See application file for complete search history.

(56) References Cited

U.S. PATENT DOCUMENTS 4,414,611 A * 11/1983 Seltzer et al. ............... 362/183
4,663,696 A * 5/1987 Miyazawa et al. .......... 362/465
7,291,951 B2 * 11/2007 Takiguchi et al. ......... 310/75 R

* cited by examiner

*Primary Examiner*—John A Ward
(74) *Attorney, Agent, or Firm*—Alan Kamrath; Kamrath & Associates PA

(57) ABSTRACT

A lamp assembly comprises a lamp cover formed with a plurality of through holes on a peripheral surface thereof. The lamp cover accommodates a positioning element made of a tough material for framing a light-penetrable element therein. The lamp cover fitted with the light-penetrable element allows a plurality of resilient catch elements formed on a periphery of a reflective housing to engage with the through holes formed on the lamp cover at corresponding locations, so that the lamp assembly can be assembled, and have its components rapidly positioned in place, by engaging the components to one another, rather than by screwing with threaded fasteners, thereby simplifying fabrication of the lamp assembly.

2 Claims, 4 Drawing Sheets

LAMP ASSEMBLY

BACKGROUND OF THE INVENTION

1. Technical Field

The present invention relates to a lamp assembly, and more particularly, to a lamp assembly to be installed at a predetermined location, wherein the lamp assembly can be assembled through engagement among components thereof rather than by screwing with threaded fasteners, thereby simplifying installation of the lamp assembly.

2. Description of Related Art

Presently, lamp assemblies to be installed in areas to be illuminated have different configurations to suit specific needs. Generally, a lamp assembly is assembled by putting prefabricated components together in a specific order, and then securing the components to one another with a plurality of threaded fasteners to form a single piece. Meanwhile, a lamp is positioned in the lamp assembly by screwing, so that the desired lamp assembly is completed. While assembling the lamp assembly, the components thereof must be secured in place with the threaded fasteners, which results in a complicated, time-consuming and inconvenient installation process.

BRIEF SUMMARY OF THE INVENTION

The present invention provides an improvement over the existing lamp assemblies, with particular regard to overcoming the inconvenience in fabrication, so that a lamp assembly can be assembled through engagement among components thereof, rather than by screwing with threaded elements, thereby simplifying fabrication of the lamp assembly.

A primary objective of the present invention is to provide a lamp assembly comprising a lamp cover formed with a plurality of through holes on a peripheral surface thereof. The lamp cover accommodates a positioning element made of a tough material for framing a light-penetrable element therein. The lamp cover fitted with the light-penetrable element allows a plurality of resilient catch elements formed on a periphery of a reflective housing to engage with the through holes formed on the lamp cover at corresponding locations, so that the lamp assembly can be assembled, and have its components rapidly positioned in place, by engaging the components to one another, thereby substantially simplifying installation of the lamp assembly.

A secondary objective of the invention is to provide a lamp assembly wherein a lamp can be rapidly coupled to a fixing seat by insertion, so that the lamp can be easily replaced and detached.

BRIEF DESCRIPTION OF THE SEVERAL VIEWS OF THE DRAWINGS

The invention as well as a preferred mode of use, further objectives and advantages thereof will best be understood by reference to the following detailed description of an illustrative embodiment when read in conjunction with the accompanying drawings, wherein.

DETAILED DESCRIPTION OF THE INVENTION

Figure 1:
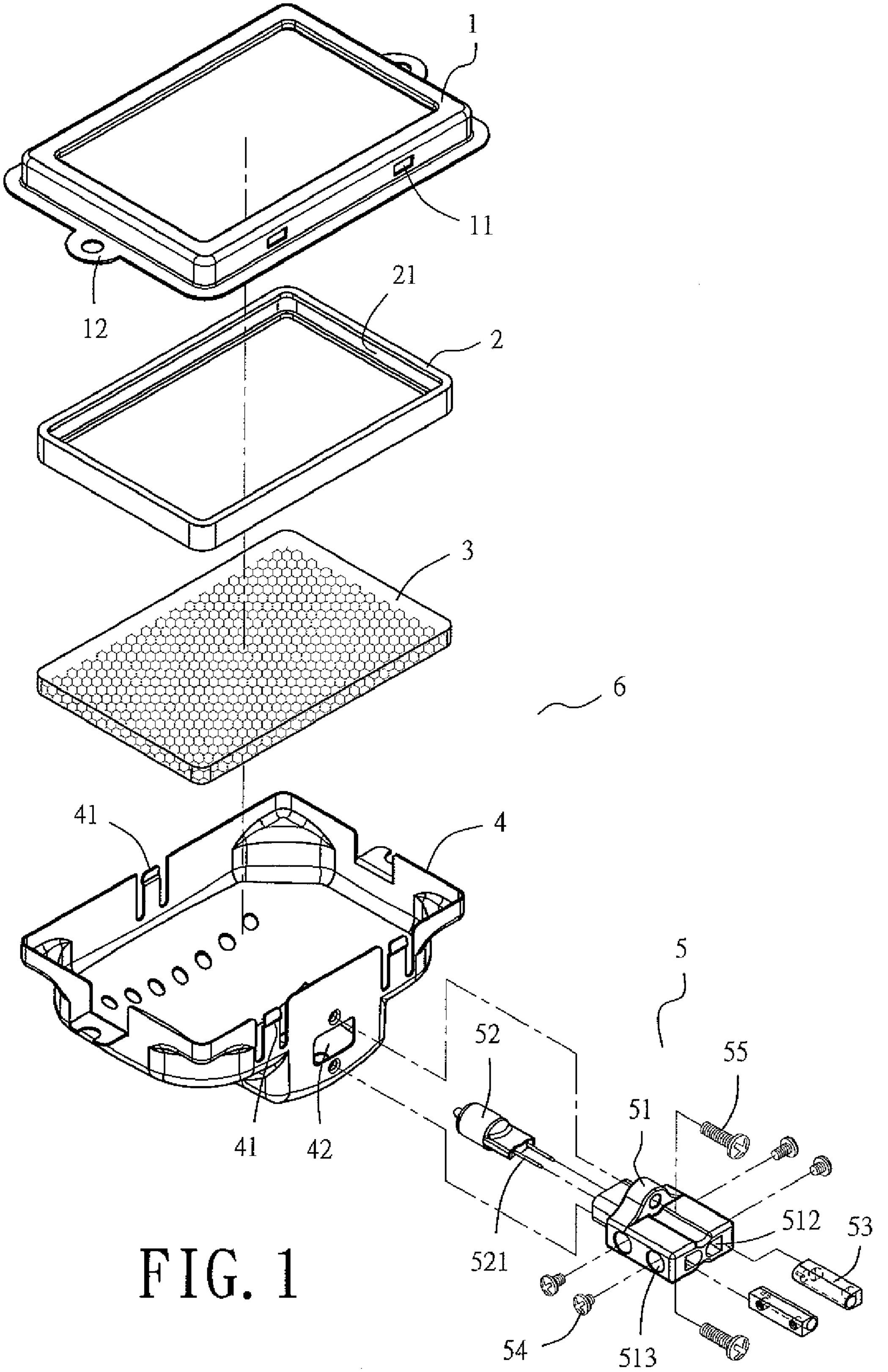
FIG. 1 is an exploded perspective view of a lamp assembly according to the present invention.
Figure 2:
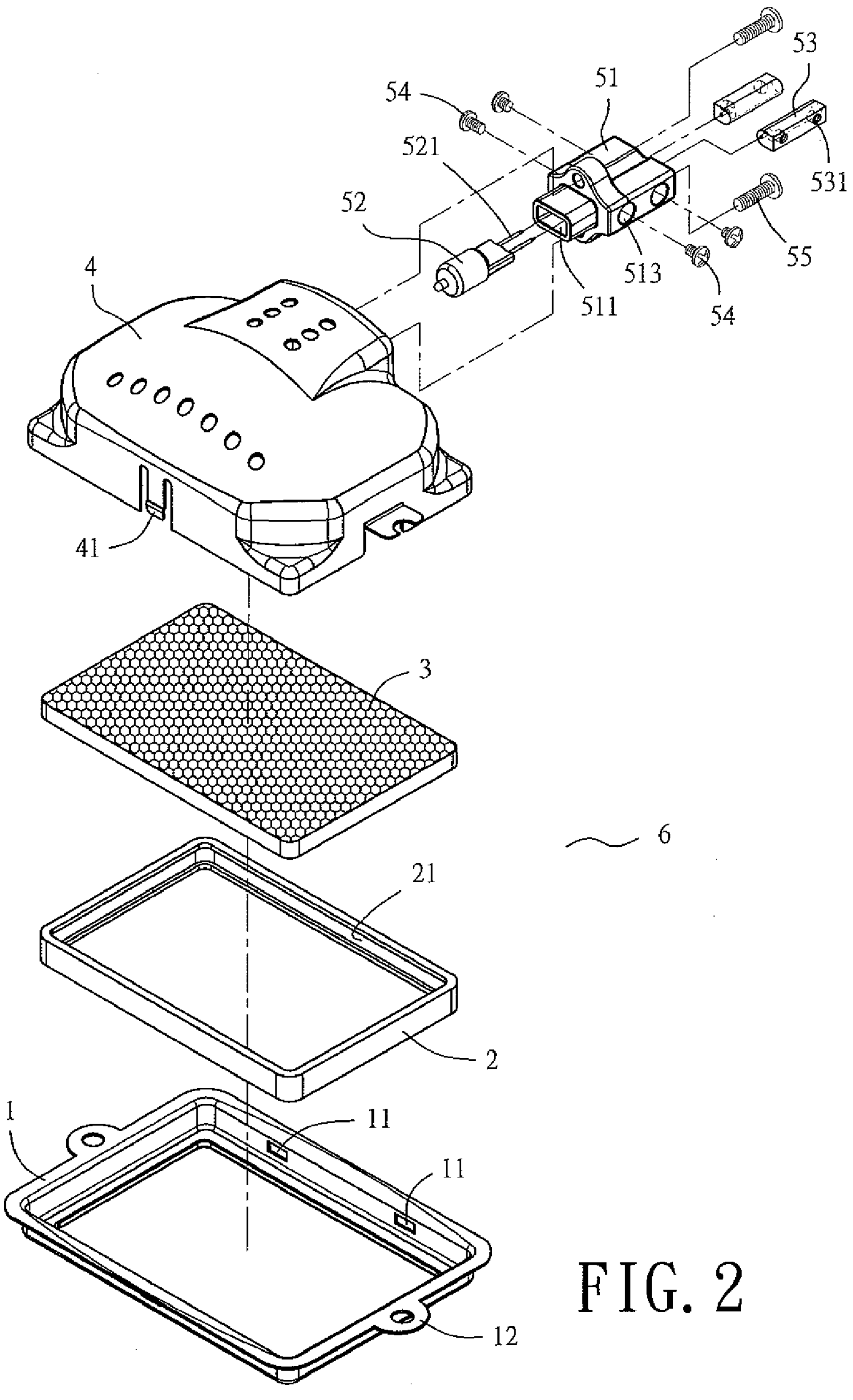
FIG. 2 is an exploded perspective view of the lamp assembly according to the present invention from another viewing angle.

Referring to FIGS. 1 and 2, a lamp assembly 6 according to the present invention comprises a lamp cover 1, a positioning element 2, a light-penetrable element 3, a reflective housing 4 and a lamp-fixing unit 5.

The lamp cover 1 is a hollow frame having a predetermined shape. The lamp cover 1 is formed with a plurality of through holes 11 on a peripheral surface thereof, and bilaterally provided with extended assembly protrusions 12.

The positioning element 2 is a frame made of a tough material and shaped according to an inner peripheral configuration of the lamp cover 1. The positioning element 2 is formed with a retaining edge 21 on an inner periphery thereof for retaining the light-penetrable element 3 in place.

The light-penetrable element 3 is substantially a light-penetrable plate (a glass plate is used in this embodiment as the light-penetrable element) shaped according to a peripheral configuration of the positioning element 2.

The reflective housing 4 is a metal component shaped according to the inner peripheral configuration of the lamp cover 1. The reflective housing 4 is formed with a plurality of resilient catch elements 41 on a periphery thereof, and an opening 42 on a side of the periphery for mounting the lamp-fixing unit 5 therein.

The lamp-fixing unit 5 comprises a fixing seat 51, a lamp 52, wire-holding tubes 53 and a plurality of threaded fasteners 54.

The fixing seat 51 has an end formed with a cavity 511 for receiving extended terminals 521 of the lamp 52 (as shown in FIG. 2), and another end formed with two spaced-apart through holes 512 in communication with the cavity 511 (as shown in FIGS. 1 and 2) for receiving therein the wire-holing tubes 53 passed through with wires. The fixing seat 51 is further formed with at least one hole 513 passing through two sides thereof and communicating with the two through holes 512, so that the treaded fasteners 54 can be disposed in the holes 513 and secure the extended terminals 521 of the lamp 52 and the wires passed through the wire-holding tubes 53 in place by pressing (shown in FIG. 3A).

The lamp 52 is a lighting lamp having an end provided with the extended terminals 521 and can be inserted into the cavity 511 on the end of the fixing seat 51.

The wire-holding tubes 53 are hollow components made of a tough material for the wires to pass through. Each of the wire-holding tubes 53 has a side formed with at least one threaded hole 531 passing therethrough. (In this embodiment, a spacing between the threaded holes 531 is dependent on a spacing between the holes 513 on the fixing seat 51.)

Figure 3:
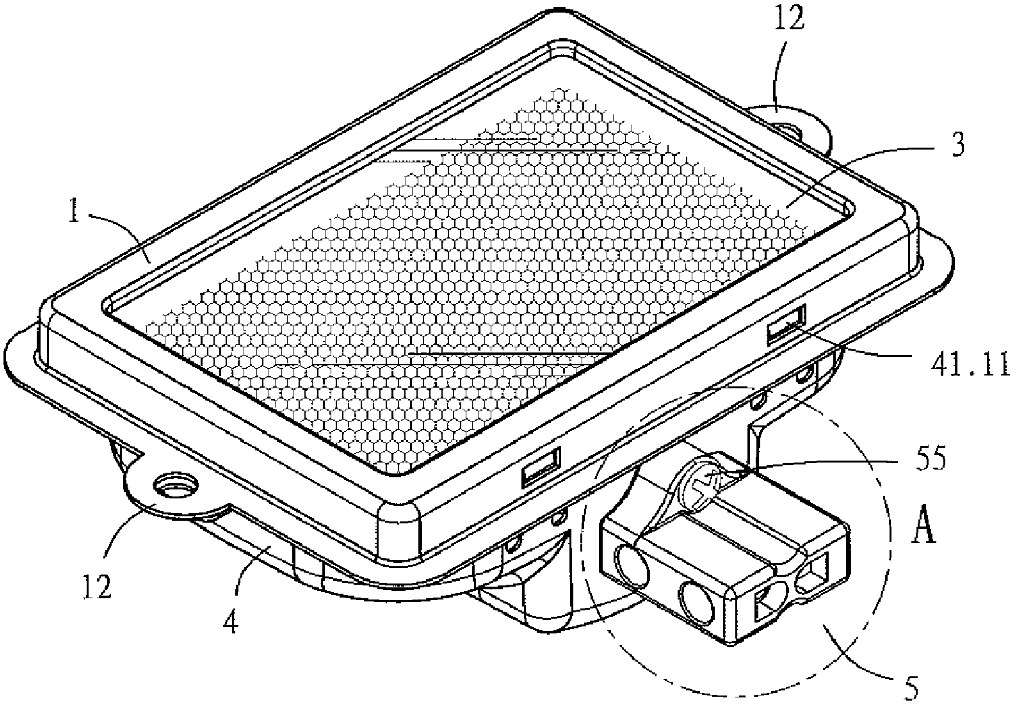
FIG. 3 is an assembled perspective view of the lamp assembly according to the present invention.
Figure 3A:
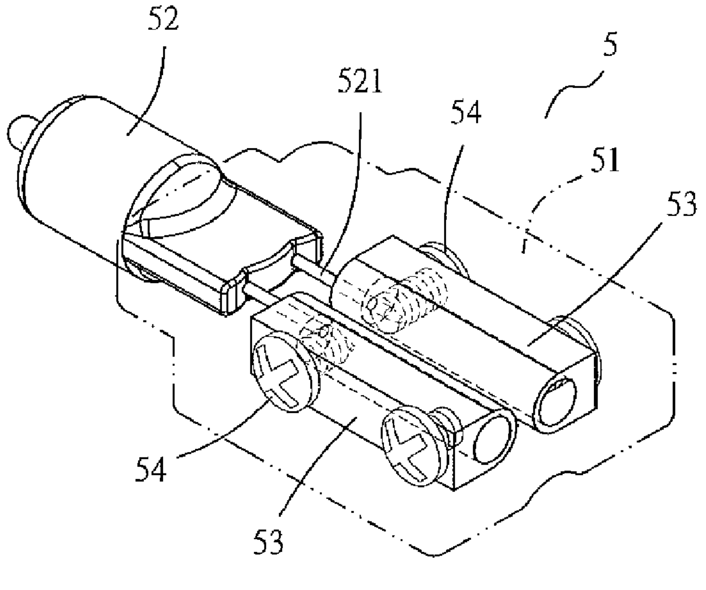
FIG. 3A is an enlarged detailed view of a lamp-fixing unit in FIG. 3.
Figure 4:
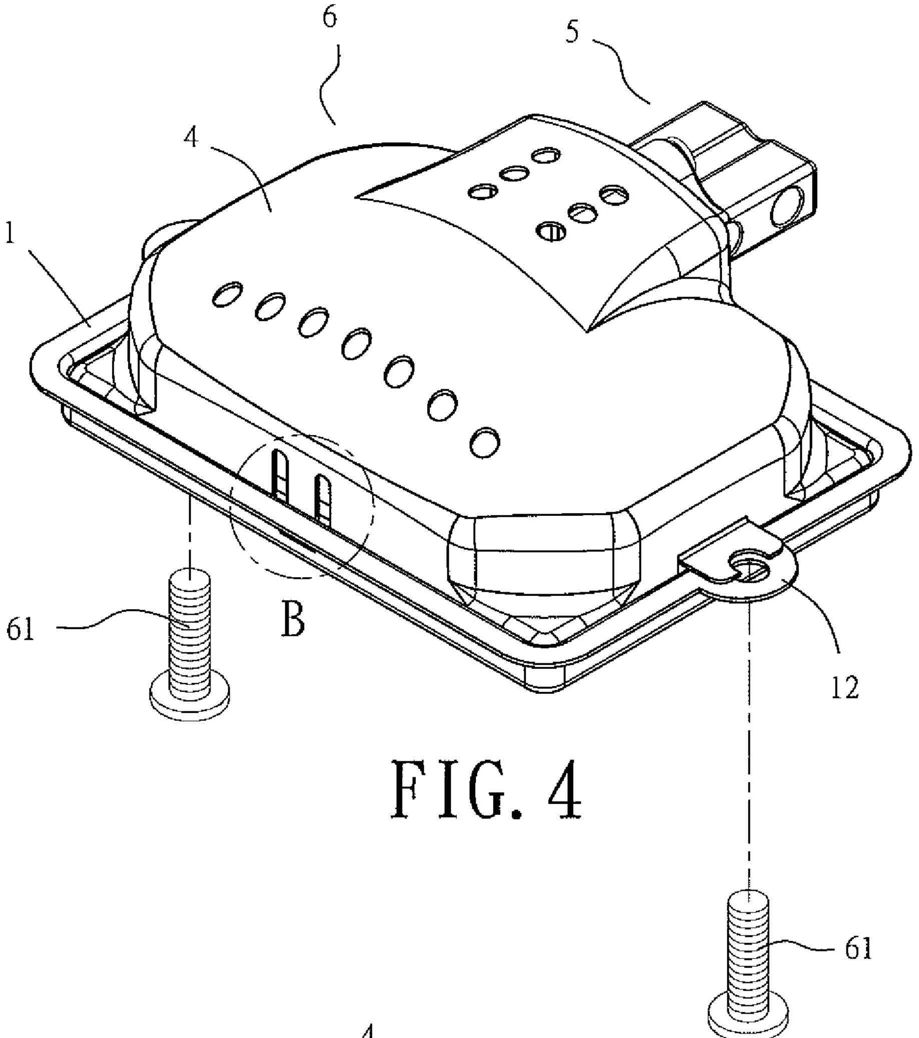
FIG. 4 is an assembled perspective view of the lamp assembly according to the present invention from another viewing angle.
Figure 4B:
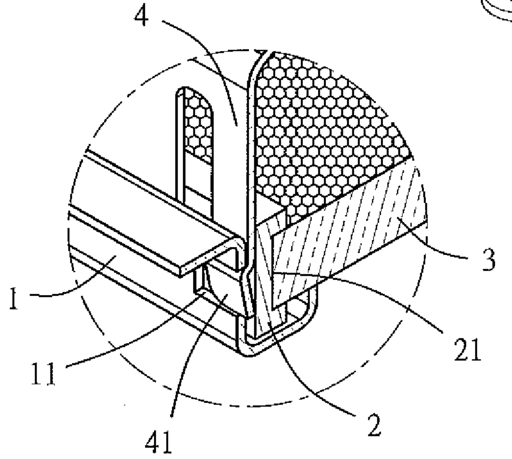
FIG. 4B is an enlarged sectional view showing component engagement in FIG. 4.

Referring to FIG. 3, the lamp cover 1, the positioning element 2, the light-penetrable element 3, the reflective housing 4 and the lamp-fixing unit 5 are assembled in the following way. First, the light-penetrable element 3 is fitted in the positioning element 2. Then, the positioning element 2 mounted with the light-penetrable element 3 is received in the lamp cover 1. Next, the reflective housing 4 is fitted into the lamp cover 1 mounted with the light-penetrable element 3 (as shown in FIG. 4), so that the plurality of resilient catch elements 41 formed on the periphery of the reflective housing 4 are engaged with the corresponding through holes 11 on the peripheral surface of the lamp cover 1 (as shown in FIG. 4B). Following that, the lamp 52 inserted in the end of the lamp-fixing unit 5 is passed through the opening 42 on the side of the periphery of the reflective housing 4, which has been assembled with the lamp cover 1, the positioning element 2 and the light-penetrable element 3. Next, the lamp-fixing unit 5, now abutting the periphery of the reflective housing 4, is secured to the reflective housing 4 with a threaded fastener 55 (as shown in FIG. 3), thereby completing the lamp assembly 6. The lamp assembly 6 can then be installed at an intended location with threaded fasteners 61 (as shown in FIG. 4).

The lamp assembly having the aforementioned configuration has the following advantages in assembly:

1. The lamp assembly can be assembled, and have its components rapidly positioned in place, by engaging the components to one another, thereby significantly simplifying fabrication of the lamp assembly; and 2. The lamp can be rapidly coupled to the fixing seat by insertion, thereby allowing the lamp to be easily replaced and detached.

The invention claimed is:

1. A lamp assembly to be installed at a predetermined location, comprising a lamp cover mounted with a light-penetrable element therein, and a reflective housing matching the lamp cover, the lamp assembly being characterized in that:

the lamp cover is formed with a plurality of through holes on a peripheral surface thereof;

a positioning element is received in the lamp cover, wherein the positioning element is a frame made of a tough material for framing the light-penetrable element therein; and the reflective housing is formed with a plurality of resilient catch elements on a periphery thereof, each of the resilient catch elements being engageable with a corresponding one of the through holes formed on the peripheral surface of the lamp cover, in which the reflective housing is further formed with an opening on a side of the periphery for mounting a lamp-fixing unit therein;

wherein the lamp assembly can be assembled through engagement among the lamp cover, the positioning element, the light-penetrable element and the reflective housing, so that the lamp cover, the positioning element, the light-penetrable element and the reflective housing are rapidly positioned in place, thereby significantly simplifying installation of the lamp assembly.

2. The lamp assembly of claim 1, wherein a lamp can be rapidly coupled to the lamp-fixing unit mounted in the reflective housing of the lamp assembly by being inserted into the lamp-fixing unit, so that the lamp can be easily replaced and detached.

* * * * *